US011754049B2

(12) United States Patent
Choudhary et al.

(10) Patent No.: US 11,754,049 B2
(45) Date of Patent: Sep. 12, 2023

(54) PLATFORM FOR A WIND TURBINE, WIND TURBINE WITH THE PLATFORM AND METHOD FOR ASSEMBLING A WIND TURBINE

(71) Applicant: Siemens Gamesa Renewable Energy A/S, Brande (DK)

(72) Inventors: Vikash Choudhary, Himachal Pradesh (IN); Torben Reuss Damgaard, Herning (DK); Devender Kumar, Delhi (IN); Joern Olesen, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/244,449

(22) Filed: Apr. 29, 2021

(65) Prior Publication Data
US 2021/0340959 A1 Nov. 4, 2021

(30) Foreign Application Priority Data
Apr. 30, 2020 (IN) .............................. 202031018590

(51) Int. Cl.
*F03D 13/20* (2016.01)
(52) U.S. Cl.
CPC .......... *F03D 13/20* (2016.05); *F05B 2230/61* (2013.01); *F05B 2240/912* (2013.01); *F05B 2240/916* (2013.01); *F05B 2260/30* (2013.01)
(58) Field of Classification Search
CPC ....... B66B 1/2416; B66B 5/0075; B66B 9/00; F03D 1/00; F03D 13/20; F03D 13/10; F03D 13/25; F03D 80/50; F05B 2230/61; F05B 2240/912; F05B 2240/916; F05B 2260/30; B66C 1/108; B66C 23/185; B66C 23/207;
(Continued)

(56) References Cited

U.S. PATENT DOCUMENTS 1,815,429 A * 7/1931 Canaday ................. E04H 6/428
52/30
3,851,736 A * 12/1974 Westlake .............. B66B 19/002
52/30
(Continued)

FOREIGN PATENT DOCUMENTS

KR 101524158 B1 5/2015
WO 2012052583 A1 4/2012
(Continued)

OTHER PUBLICATIONS

Extended European Search Report in corresponding European Patent Application No. 20182618.7 dated Jan. 22, 2021. 27 pages.

*Primary Examiner* — Christopher Verdier
*Assistant Examiner* — Ryan C Clark
(74) *Attorney, Agent, or Firm* — Schmeiser, Olsen & Watts LLP

(57) ABSTRACT

A platform for a wind turbine, the platform including a lift beam for carrying a load of a transport cabin of a tower lift of the wind turbine is provided. By the lift beam being part of the platform, an easier installation of the platform and the lift beam is possible. Furthermore, less components are needed. Another advantage is that the lift beam is installed at a smaller height of the tower where the tower has a larger diameter compared to a conventional lift beam. This increases the available space for lift cables hanging from the lift beam.

13 Claims, 6 Drawing Sheets

(58) Field of Classification Search
CPC ......... Y10T 29/49631; Y10T 29/49634; E04H 12/00; E04H 12/34
USPC ........................................................... 52/30
See application file for complete search history.

(56) References Cited

U.S. PATENT DOCUMENTS

| | | | |
|---|---|---|---|
| 6,425,463 B1 * | 7/2002 | Broyan | B66B 7/062 |
| | | | 187/254 |
| 7,543,685 B2 * | 6/2009 | Ach | B66B 11/004 |
| | | | 187/250 |
| 2011/0140437 A1 | 6/2011 | Vemuri et al. | |
| 2013/0174508 A1 * | 7/2013 | Reed | F03D 13/20 |
| | | | 52/655.1 |

FOREIGN PATENT DOCUMENTS

| | | | | |
|---|---|---|---|---|
| WO | WO-2012052583 A1 * | 4/2012 | ............. | F03D 1/003 |
| WO | 2015078476 A1 | 6/2015 | | |
| WO | WO-2015078476 A1 * | 6/2015 | ............. | F03D 13/10 |

\* cited by examiner

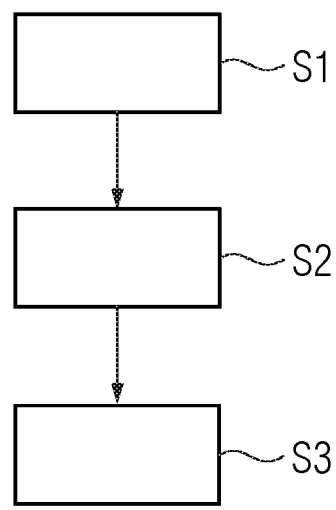

PLATFORM FOR A WIND TURBINE, WIND TURBINE WITH THE PLATFORM AND METHOD FOR ASSEMBLING A WIND TURBINE

CROSS-REFERENCE TO RELATED APPLICATIONS

This application claims priority to Indian Patent Application No. 202031018590, having a filing date of Apr. 30, 2020, the entire contents of which are hereby incorporated by reference.

FIELD OF TECHNOLOGY

The present invention relates to a platform for a wind turbine, a wind turbine with the platform and a method for assembling a wind turbine.

BACKGROUND

For transporting objects or passengers within a tower of a wind turbine upwards and downwards, wind turbines may comprise a tower lift inside. The tower lift can transport loads, for example, by moving a transport cabin from a lower platform to an upper platform of the tower. Above the highest tower platform served by the lift, a beam is required for carrying the load of the transport cabin.

Conventionally, a lift beam for carrying the load of the transport cabin is installed above the highest tower platform. The lift beam is installed, for example, about half a meter above the highest tower platform by attaching it to the tower wall. The highest platform of the tower is usually the yaw platform. On the yaw platform, a yaw system is arranged for driving and controlling the yaw bearing of the wind turbine.

However, the space between the yaw platform and the top flange of the tower is very limited. This is in particular the case as in this region the tower is usually strongly tapered towards the upper end of the tower. Further, in this limited space also the attachment means of the yaw platform are arranged. The yaw platform is, for example, attached by means of stays connected to the top flange of the tower. Due to the limited space, installation of a lift beam between the yaw platform and the top flange and its maintenance is difficult. Furthermore, lift guide wires hanging from the lift beam are positioned very close to the tower wall due to the steep coning of the wind turbine in this region.

SUMMARY

It is one aspect of the present invention to provide an improved platform for a wind turbine, an improved wind turbine with the platform and an improved method for assembling a wind turbine.

Accordingly, a platform for a wind turbine is provided. The platform comprises a lift beam for carrying a load of a transport cabin of a tower lift of the wind turbine.

By the lift beam being part of the platform, an easier installation of the platform and the lift beam is possible compared to the case where the platform and the lift beam are two separate parts which are required to be installed separately. Furthermore, less components are needed as the lift beam does not require extra wall attachment means. Further, the lift beam may replace a part of the platform bearing structure.

Another advantage of the proposed platform with the lift beam is that the lift beam is installed at a lower height of the tower where the tower has a larger diameter compared to a conventional lift beam. This is the case as the tower in the topmost section is strongly tapered towards the upper tower end with the tower diameter becoming significantly smaller for larger tower heights. Having the lift beam not above, for example half a meter above, the platform but as part of the platform, therefore, increases the available space for lift cables hanging from the lift beam. In particular, it increases the available space for the guide cables of the tower lift.

A wind turbine is an apparatus to convert the wind's kinetic energy into electrical energy. The wind turbine comprises, for example, a rotor having one or more blades, a nacelle comprising a generator and a tower holding, at its top end, the nacelle. The tower of the wind turbine, for example a transition piece of the tower, is connected to a foundation of the wind turbine such as a monopile in the sea bed.

The platform comprising the lift beam is arranged inside the tower. The platform is, in particular, connected to the tower wall or to a tower flange. The platform is, for example, connected to the tower wall by means of wall brackets, or connected to the tower flange by means of stays.

The lift beam has, for example, a longitudinal structure. The lift beam is, for example, made from metal such as steel.

When the wind turbine tower with the platform having the lift beam is in an erected state, the lift beam is oriented horizontally with respect to a ground. In other words, when the wind turbine tower with the platform having the lift beam is in an erected state, the lift beam is oriented perpendicular to a longitudinal axis of the tower.

The wind turbine comprises inside its tower a tower lift for transporting a load upwards or downwards within the tower. The tower lift is, for example, configured for transporting objects and/or passengers within the tower.

The wind turbine tower may comprise inside—in addition to the platform having the lift beam—several further platforms on several levels. The tower lift is, for example, configured for transporting a load from a lower platform to a higher platform of these further platforms or vice versa. Furthermore, the tower lift may be configured to transport a load from any of the further platforms to any other of the further platforms.

The tower lift is, for example, configured for transporting a load from an entrance platform to a platform above the entrance platform or vice versa. The entrance platform is, for example, a platform inside the tower being on the same level as a landing platform arranged outside the tower.

The platform comprising the lift beam is, in particular, an upper platform, for example the highest platform, inside the tower. The platform comprising the lift beam is, for example, a yaw platform of the wind turbine tower. On the yaw platform, a yaw system is arranged for driving and/or controlling a yaw bearing of the wind turbine. The yaw bearing allows rotation of the nacelle relative to the tower in azimuthal direction for optimal orientation of the rotor of the wind turbine relative to the wind direction.

The highest platform served by the tower lift ("lift platform"), is, for example, a platform below and next to the yaw platform of the tower.

The tower lift comprises a transport cabin to accommodate the load to be transported. Further, the tower lift comprises one or more cables for carrying and/or guiding the transport cabin. The one or more cables of the tower lift are attached to the lift beam.

The one or more cables of the tower lift include, for example, a drive cable, a safety cable and/or one or more guide cables. The drive cable and the safety cable are—in addition of being attached at a first end to the lift beam—attached at a second end to the transport cabin of the tower lift for carrying the transport cabin. The one or more guide cables are—in addition of being attached at a first end to the lift beam—attached at a second end to a lower portion of the wind turbine tower, the lower portion being arranged below the lowest platform served by the lift. This lower portion is, for example, a portion of an additional tower platform arranged below the lowest platform served by the lift. Further, the one or more guide cables are, in particular, tensioned between the lift beam and this lower portion.

The tower lift comprises a motor for driving the lift. The motor is, for example, arranged on top of the transport cabin. The transport cabin is, for example, moving up inside the tower by climbing along the drive cable while the drive cable is wound up on a wheel by the motor.

The tower lift further comprises a lift shaft formed by a housing. The lift shaft extends in the interior of the tower at least from the lowest platform served by the lift to the highest platform served by the lift. The transport cabin is moving upwards and downwards within the lift shaft. The tower lift further comprises the usual equipment necessary to operate a lift.

According to an embodiment, the platform comprises a bearing structure and a floor plate supported by the bearing structure, wherein the bearing structure comprises the lift beam.

Thus, the lift beam is not only carrying the load of the transport cabin of the lift but also functions together with the remaining bearing structure as genuine bearing structure of the platform. Further, the lift beam is not only carrying the load of the transport cabin of the lift but is also supporting together with the remaining bearing structure the floor plate.

In particular, the platform bearing structure including the lift beam supports the floor plate from below. Further, the platform bearing structure, in particular the lift beam, is configured to support the load of the transport cabin of the tower lift from above.

According to a further embodiment, the lift beam is integrally formed with the platform bearing structure.

In particular, the platform bearing structure comprises the lift beam and a remaining bearing structure. The remaining bearing structure also comprises beams. Further, the lift beam and the remaining bearing structure are fixedly connected with each other. The lift beam and the remaining bearing structure are, for example, fixedly connected with each other by welding or bolting. In particular, the lift beam and the remaining bearing structure have a one-piece structure.

According to a further embodiment, the floor plate is arranged above the platform bearing structure having the lift beam, and the floor plate is fixed to the lift beam.

In particular, the lift beam is arranged below the floor plate. In particular, the lift beam is arranged entirely below the floor plate.

Having the floor plate arranged above the lift beam, the lift beam is not interfering with objects, workers and/or work carried out on the floor plate.

According to a further embodiment, the platform comprises attachment means connected to the lift beam and configured for attaching one or more cables of the tower lift to the lift beam.

Thus, the lift cables can be attached to the platform having the lift beam, in particular, to the lift beam.

According to a further embodiment, the attachment means protrude above the floorplate.

Having the attachment means protruding above the floor plate allows a better maintenance and inspection of the lift cables and the connection between the lift cables and the lift beam. For example, a worker standing on the floor plate of the platform has an easy access to the top most portion of the lift cables, the connection region between the lift cables and the lift beam and/or the attachment means.

According to a further embodiment, the lift beam comprises one or more openings for passage of one or more cables of the tower lift.

By having the one or more openings of the lift beam, the lift cables can be better attached to the lift beam. In particular, a stronger connection between the lift cables and the lift beam can be achieved. For example, a force acting on the lift beam due to the load of the transport cabin hanging with the lift cables from the lift beam can be better transferred to the lift beam.

The one or more openings are, for example, one or more through holes of the lift beam. Alternatively, the one or more openings are, for example, formed by one or more gaps of the lift beam. For example, the one or more openings are formed by a single gap of the lift beam.

For example, also the floor plate comprises one or more openings for passage of the one or more cables of the tower lift, whereas the one or more openings of the floor plate correspond to the one or more openings of the lift beam.

According to a further embodiment, the attachment means include one or more brackets and one or more pins supported by the one or more brackets, each pin being configured for connection with one of the cables of the tower lift.

Thus, for example a loop of a lift cable or a hook of a lift cable can be engaged with the pin.

The pin is, for example, extending in a direction perpendicular to a longitudinal axis of the tower in the erected state. The pin is, for example, extending in a direction perpendicular to a longitudinal direction of the lift beam in the installed state of the platform and the erected state of the tower.

The pin is, for example, a shaft of a bolt.

The attachment means include, for example, one bracket having a top-hat cross-section profile.

The attachment means include, for example, one or more openings at a top portion of the top-hat cross-section profile allowing access to the lift cables. The one or more openings of the bracket correspond, for example, with the one or more openings of the lift beam. The one or more openings of the bracket correspond, for example, with the one or more openings of the floor plate.

According to a further embodiment, the lift beam has a double-C-shaped cross-section profile.

Having the double-C-shaped cross-section profile of the lift beam provides a simple and cheap configuration of the lift beam. Further, it allows to provide an opening for the lift cables in a simple manner.

A double-C-shaped cross-section profile comprises, in particular, two C-shaped profiles arranged back-to-back with each other. The two C-shaped profiles are, for example, arranged back-to-back with each other such that there is a continuous gap between the two C-shaped profiles. In other words, the lift beam having the double-C-shaped cross-section profile comprises two separate longitudinal elements (beams) being separate from each other by said gap. The gap being configured for a passage of the lift cables.

Each C-shaped profile comprises a web and two flanges. The lift beam is, in particular, oriented horizontally, the web of each C-shaped profile is oriented vertically and its flanges are oriented horizontally with respect to a ground in the installed state of the platform and the erected state of the tower.

Alternatively, the lift beam may also comprise another cross-section profile. The lift beam may, for example, comprise an I-profile (H profile).

According to a further embodiment, the attachment means include a bracket having a top-hat cross-section profile,
the lift beam has a gap between two back-to-back arranged C-shaped profiles of the double-C-shaped cross-section profile, the gap being configured for passage of one or more cables of the tower lift,
the attachment means are connected to the lift beam such that flanges of the top-hat profile are connected with upper flanges of the double-C-shaped profile, and/or
the attachment means include the one or more pins supported by the bracket, each pin being configured for connection with one of the cables of the tower lift when passed through the gap of the lift beam.

The top-hat profile of the bracket comprises, in particular, two flanges connected to an inverse U-shaped profile.

The attachment means are connected to the lift beam, for example, by bolting. The attachment means are connected to the lift beam, for example, such that each one of the flanges of the top-hat profile is connected to an upper flange of the two flanges of each C-shaped profile.

Further, the floor plate is, for example, arranged between the bracket and the lift beam such that the bracket, the floor plate and the lift beam are connected to each other. For example, the bracket is bolted to the floor plate and the lift beam.

According to a second aspect, a wind turbine is provided. The wind turbine comprises:
a tower,
a lower platform and an upper platform inside the tower,
a tower lift comprising a transport cabin for travelling from the lower platform to the upper platform or vice versa, and
a platform with a lift beam as described above, wherein the platform is arranged inside the tower of the wind turbine above the upper platform, the lift beam of the platform carrying a load of the transport cabin of the tower lift.

According to an embodiment of the second aspect, the tower lift comprises one or more cables attached to the lift beam of the platform.

According to a further embodiment of the second aspect, the one or more cables of the tower lift include a drive cable, a safety cable and/or one or more guide cables, the drive cable and the safety cable being attached to the transport cabin of the tower lift for carrying the transport cabin, and the one or more guide cables being attached to a lower portion of the tower below the lower platform.

According to a third aspect, a method for assembling a wind turbine is proposed. The method comprises the steps of:
a) manufacturing a platform, the platform comprising a lift beam for bearing a load of a transport cabin of a tower lift, and
b) installing the platform in a tower.

According to an embodiment of the third aspect, the method comprises, after step b), the step of installing the tower lift in the wind turbine tower, wherein one or more cables of the tower lift are attached to the lift beam, and the one or more cables are configured for carrying and/or guiding the transport cabin of the tower lift.

According to a further embodiment of the third aspect, the platform is a yaw platform.

According to a further embodiment of the third aspect, the platform is fixed to a portion of a tower wall and/or a tower section flange of the wind turbine tower.

The embodiments and features described with reference to the platform of the present invention apply mutatis mutandis to the wind turbine of the present invention and to the method of the present invention and vice versa.

Further possible implementations or alternative solutions of the present invention also encompass combinations—that are not explicitly mentioned herein—of features described above or below with regard to the embodiments. The person skilled in the art may also add individual or isolated aspects and features to the most basic form of the present invention.

Some of the embodiments will be described in detail, with reference to the following figures, wherein like designations denote like members, wherein:

FIG. 6 depicts a flowchart illustrating a method for assembling the wind turbine of FIG. 1.

DETAILED DESCRIPTION

Figure 1:
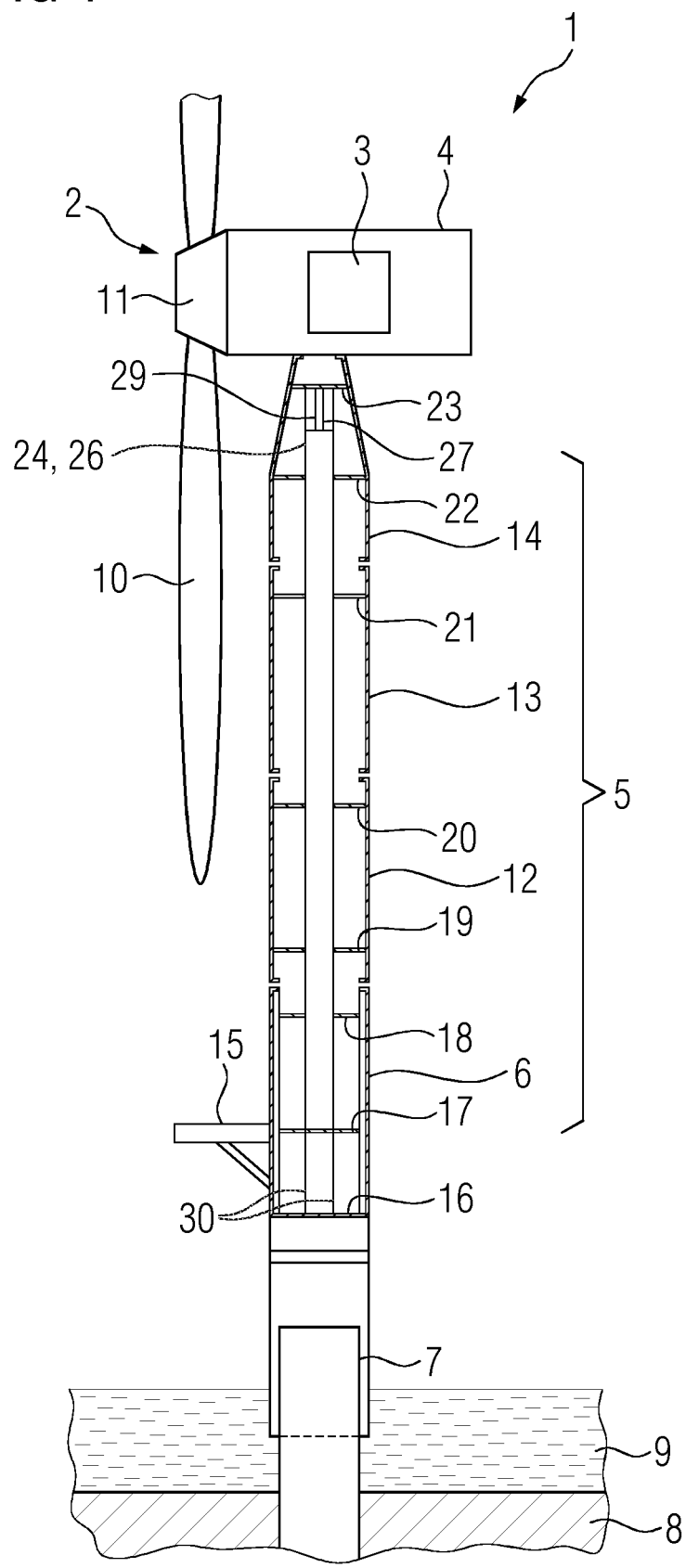
FIG. 1 depicts, in partial cross-section, a wind turbine according to an embodiment.

In the Figures, like reference numerals designate like or functionally equivalent elements, unless otherwise indicated.

FIG. 1 shows an offshore wind turbine 1 according to an embodiment.

The wind turbine 1 comprises a rotor 2 connected to a generator 3 arranged inside a nacelle 4. The nacelle 4 is arranged at the upper end of a tower 5 of the wind turbine 1 by means of a yaw bearing (not shown) such that the nacelle 4 can rotate relative to the tower 5. The tower 5 comprises, for example, a transition piece 6 erected on a monopile 7. The monopile 7 is, for example, driven into a sea bed 8 and extends above the sea water 9.

The rotor 2 comprises, for example, three rotor blades 10. The rotor blades 10 are connected to a hub 11 of the wind turbine 1. A shaft (not shown) connects the hub 11 via a gearbox (not shown) to the generator 3. The generator 3 is electrically connected to a switch gear (not shown) in the transition piece 6 of the tower 5.

The tower 5 comprises, in addition to the transition piece 6, for example, one or more tower sections 12, 13, 14. In the example of FIG. 1, the tower 5 comprises a bottom tower section 12, a middle tower section 13, and a top tower section 14.

The tower 5 (e.g., the transition piece 6) comprises on its outside a landing platform 15 to provide access to the interior of the tower 5.

The tower 5 comprises in its inside several platforms 16 to 23. The tower 5 comprises, for example, an entrance platform 17 arranged on the same level as the landing platform 15. The tower 5 comprises, for example, a low voltage platform 19 in the bottom tower section 12 on which a low voltage transformer (not shown) is located. The tower 5 comprises, for example, bolt platforms 18, 20 and 21 configured for a worker to bolt the corresponding tower sections 12, 13, 14 to each other or to the transition piece 6 when assembling the tower 5. The tower 5 comprises, for example, a lift platform 22 in the top tower section 14. The tower 5 comprises, for example, in the top tower section 14 a yaw platform 23 above the lift platform 22. On the yaw platform 23, a yaw system (not shown) for driving and/or controlling a yaw bearing (not shown) is arranged. The yaw system includes, for example, a yaw drive, a yaw brake and a yaw control system.

Furthermore, the wind turbine 1 comprises inside its tower 5 a tower lift 24 for transporting a load from a lower platform, such as the entrance platform 17, to a higher platform, such as the lift platform 22 or vice versa. The tower lift 24 may also be configured to transport a load from any of the platforms 17, 18, 19, 20, 21, 22 to any other of these platforms.

The tower lift 24 comprises a transport cabin 25 (FIG. 2) to accommodate a load such as a passenger or an object. The transport cabin 25 is moving upwards and downwards within a lift shaft housing 26. The lift shaft housing 26 extends in the interior of the tower 5 at least from the lowest platform served by the lift 24, e.g., the entrance platform 17, to the highest platform served by the lift, e.g., the lift platform 22.

Figure 2:
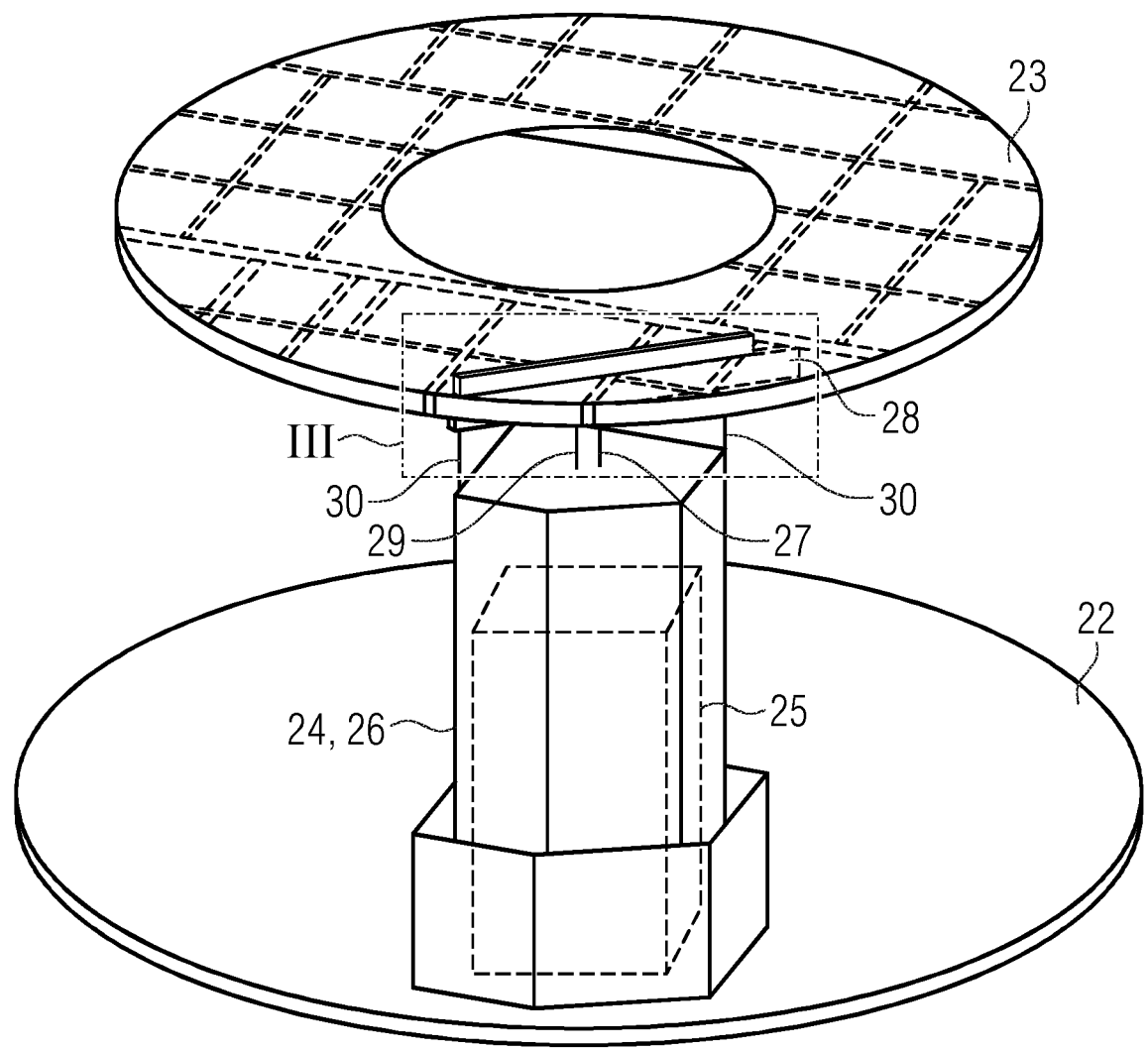
FIG. 2 depicts a perspective and detailed view of a portion of the wind turbine of FIG. 1.

The tower lift 24 comprises a motor (not shown) for driving the cabin 25. The tower lift 24 comprises several cables for carrying and guiding the transport cabin 25. The tower lift 24 comprises, in particular, a drive cable 27 attached on its one end to the cabin 25 and on its other end to a lift beam 28 integrated into the yaw platform 23 (FIG. 2). The cabin 25 moves upwards, for example, by winding up the drive cable 27 by means of the motor such that the cabin 25 climbs along the drive cable 27.

The tower lift 24 further comprises a safety cable 29 also attached on its one end to the cabin 25 and on its other end to the lift beam 28 of the yaw platform 23 (FIG. 2). The safety cable 29 is configured for preventing the cabin 25 to fall down in case that the drive cable 27 breaks.

The tower lift 24 further comprises guide cables 30, for example two guide cables 30. The guide cables 30 are attached on its one end to the lift beam 28 of the yaw platform 23 (FIG. 2) and on its other end to a lower portion, for example the platform 16, of the wind turbine tower 5 (FIG. 1). The lower portion, for example the platform 16, is, in particular located below the entrance platform 17. Each of the guide cables 30 is tensioned between the lift beam 28 of the yaw platform 23 and the platform 16. The guide cables 30 are arranged on a left and right side of the cabin 25, and they guide the cabin 25 during its up and down movement through the lift shaft 26.

FIG. 2 shows a perspective and detailed view of the lift platform 22 and the yaw platform 23 of the wind turbine 1 of FIG. 1.

The lift platform 22 is the highest platform of the tower 5 served by the lift 24. Shown on the lift platform 22 in FIG. 2 is the upper portion of the lift shaft housing 26. The transport cabin 25 is moving inside the lift shaft housing 26. In FIG. 2, the cabin 25 that has arrived on the lift platform 22 is illustrated in a dashed line. Shown on top of the lift shaft housing 26 are the drive cable 27, the safety cable 29 and the two guiding cables 30. The cables 27, 29, 30 are connected to the lift beam 28.

Figure 3:
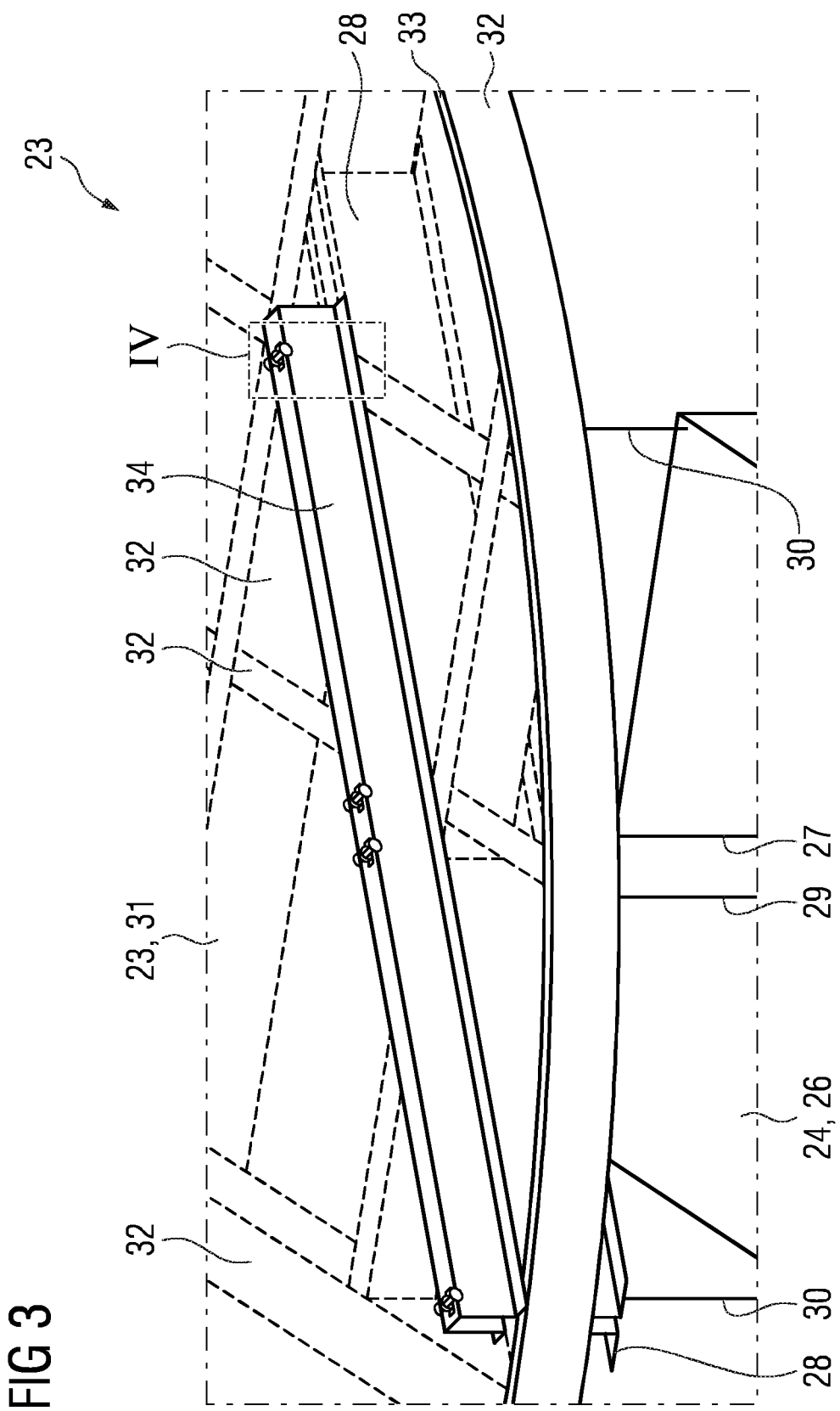
FIG. 3 depicts an enlarged view of a portion III of FIG. 2.

FIG. 3 shows an enlarged view of a portion III of FIG. 2 illustrating the lift beam 28 in more detail.

The lift beam 28 is an integral part of a bearing structure 31 of the yaw platform 23. The bearing structure 31 of the yaw platform 23 comprises the lift beam 28 and a remaining bearing structure 32. The remaining bearing structure 32 also comprises beams, as shown in FIG. 3. In particular, the lift beam 28 is integrally formed with the remaining bearing structure 32 of the yaw platform 23. In particular, the lift beam 28 and the remaining bearing structure 32 are fixedly connected with each other, for example by welding or bolting.

The yaw platform 23 comprises—in addition to the bearing structure 31—also a floor plate 33 supported by the bearing structure 31. The floor plate 33 is shown in FIG. 3 as being transparent for illustration purposes. The floor plate 33 is arranged above the platform bearing structure 31, i.e. above the lift beam 28 and the remaining bearing structure 32. Thus, the lift beam 28 is advantageously arranged entirely below the floor plate 33 such that workers can perform work on the floor plate 33 without interfering with the lift beam 28. The floor plate 33 is, in particular, fixed to the lift beam 28 and the remaining bearing structure 32.

The lift beam is configured for carrying the load of the transport cabin 25 (FIG. 2) of the tower lift 24 from above. For this purpose, the lift cables 27, 29, 30 are attached to the lift beam 28 by attachment means 34. As the attachment means 34 protrude above the floor plate 33, maintenance and inspection of the lift cables 27, 29, 30 and of the attachment means 34 can be performed easily by a worker standing on the floor plate 33.

Figure 4:
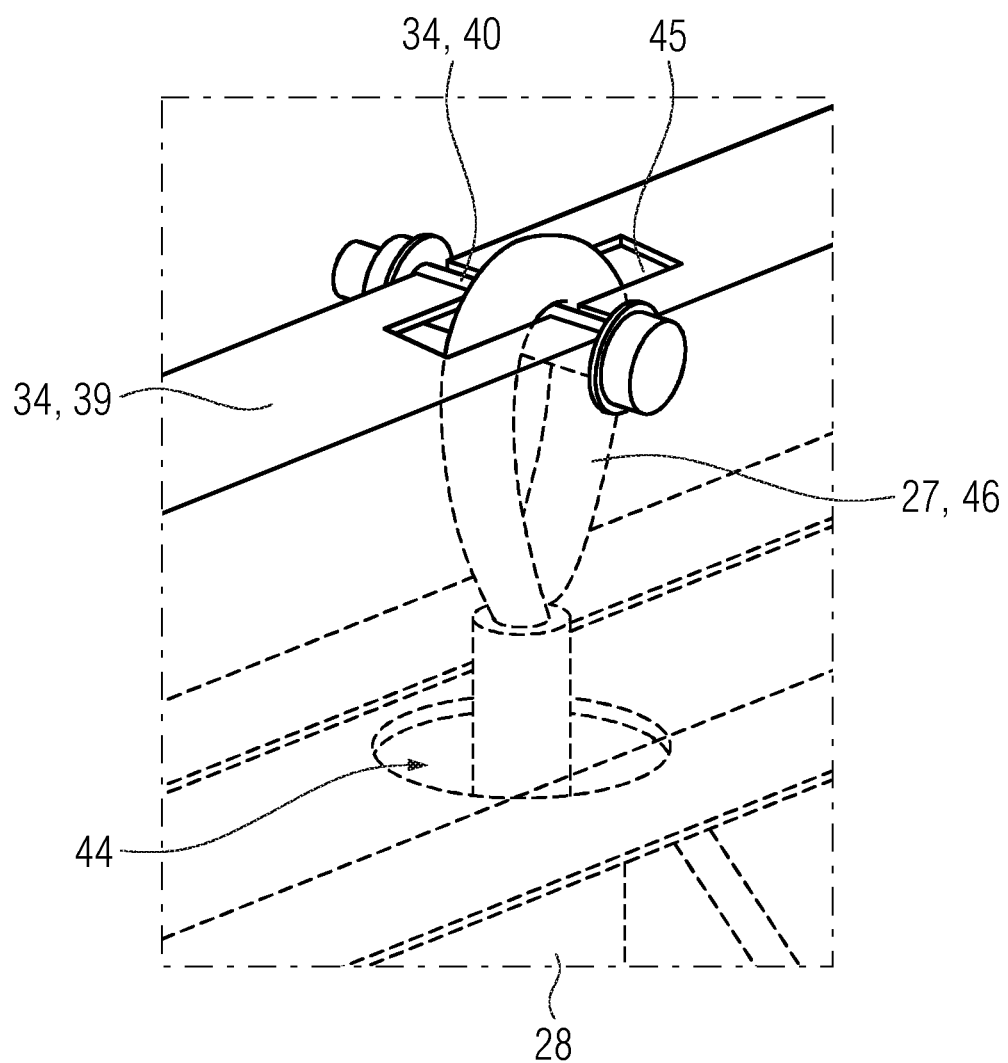
FIG. 4 depicts an enlarged view of a portion IV of FIG. 3.
Figure 5:
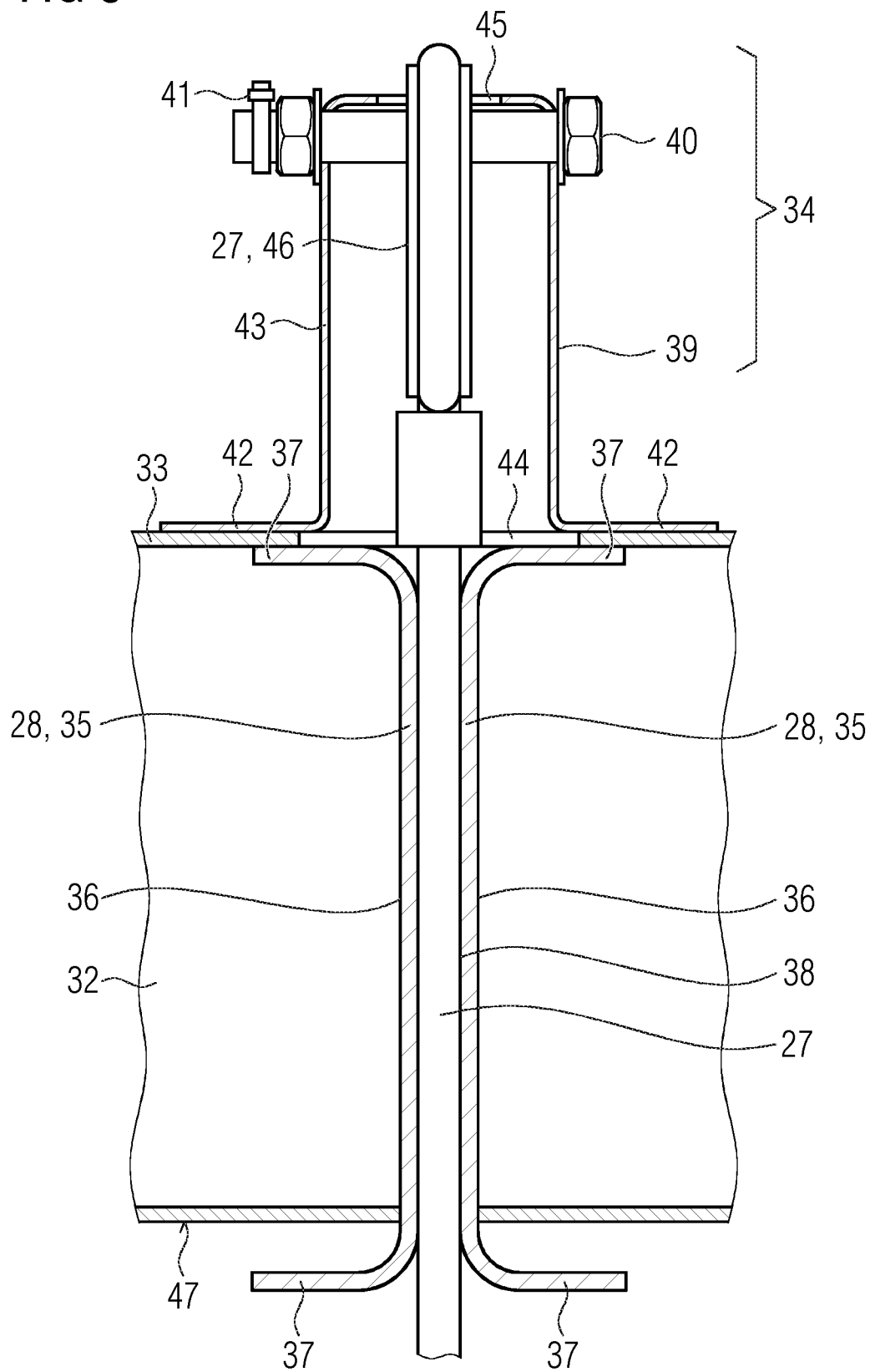
FIG. 5 depicts a cross-section view of a lift beam and attachment means of FIG. 3.

FIG. 4 shows an enlarged view of a portion IV of FIG. 3 illustrating the attachment means 34 in detail. FIG. 5 shows a cross-section view of the attachment means 34 connected to the lift beam 28.

As shown in FIG. 5, the lift beam 28 has a double-C-shaped cross-section profile. The double-C-shaped cross-section profile comprises, in particular, two C-shaped profiles 35 arranged back-to-back with each other. Each C-shaped profile 35 comprises a web 36 and two flanges 37. Between the two C-shaped profiles 35, the lift beam 28 comprises a gap 38. In other words, the lift beam 28 having the double-C-shaped cross-section profile comprises two separate longitudinal elements (beams) 35 being separated from each other by said gap 38. The lift cables 27, 29, 30 are passing through this gap. In the cross-section view of FIG. 5, the drive cable 27 passing through the gap 38 is shown as example.

Further, in the example of the figures (e.g., FIG. 5), the lift beam 28 is protruding from a lower surface 47 of the remaining bearing structure 32 of the yaw platform 23. In another embodiment, the lift beam 28 may also be flush with the lower surface 47.

The attachment means 34 include a bracket 39 and four pins 40 supported by the bracket 39 (FIGS. 3 to 5). In the example shown in the figures, each of the pins 40 is formed as a shaft of a bolt supported by the bracket 39. There is further arranged a split pin 41 to secure the pin 40.

The bracket 39 has, for example, a top-hat cross-section profile (FIG. 5). The top-hat profile of the bracket 39 comprises, in particular, two flanges 42 connected to an inverse U-shaped profile 43.

The bracket 39 is, in particular, fixed to the lift beam 28 with the floor plate 33 arranged between the bracket 39 and the lift beam 28. In particular, the flanges 42 of the top-hat profile of the bracket 39 are bolted to the floor plate 33 and to upper flanges 37 of the double-C-shaped profile of the lift beam 28.

The floor plate 33 also comprises openings 44 (in the shown example four openings for the four cables) for passage of the lift cables 27, 29, 30. The openings 44 of the floor plate 33 correspond to the gap 38 of the lift beam 28. Further, also the bracket 39 includes openings 45 (in the shown example four openings) at a top portion of the top-hat cross-section profile. The openings 45 of the bracket 39 correspond to the gap 38 of the lift beam 28 and the openings 44 of the floor plate 33.

For fixing the lift cables 27, 29, 30 to the lift beam 28, each of the lift cables 27, 29, 30 is guided through the gap 38 of the lift beam 28 and through the respective opening 44 of the floor plate 33. Each of the lift cables 27, 29, 30 comprises, for example, a loop 46. Each of the lift cables 27, 29, 30 is attached to the lift beam 28 by engaging the loop 46 with the pin 40, as shown in FIGS. 4 and 5.

In the following, a method for assembling the wind turbine 1 of FIG. 1 is described with reference to FIG. 6.

In step S1 of the method, the yaw platform 23 with the lift beam 28 (FIG. 2) of the wind turbine 1 is manufactured. The platform 23 is, for example, manufactured in a factory at a first location. The yaw platform 23 is manufactured such that it comprises the lift beam 28 integrally formed with the remaining bearing structure 32 (FIG. 3).

In step S2 of the method, the pre-manufactured yaw platform 23 having the lift beam 28 is installed in the tower 5 of the wind turbine 1. For example, the yaw platform 23 is inserted into the horizontally arranged tower 5, e.g., into the top tower section 14.

Step S2 may include transporting the pre-manufactured yaw platform 23 to a second location before inserting the platform 23 into the tower 5. The second location is, in particular, different from the first location. The pre-manufactured yaw platform 23 is, for example, transported from the factory to a harbor site. Further, the yaw platform 23 having the lift beam 28 is, for example, installed in the tower 5 at the harbor site.

By the lift beam 28 being integrally formed with the platform 23, the installation of the platform 23 with the lift beam 28 is performed in a single step and requires less components as in the case where the platform and the lift beam are two separate parts.

In step S3 of the method, the tower lift 24 is installed in the wind turbine tower 5. Thereby, the lift cables 27, 29, 30 of the tower lift 24 are attached to the lift beam 28.

Although the present invention has been described in accordance with preferred embodiments, it is obvious for the person skilled in the art that modifications are possible in all embodiments.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A platform for a wind turbine, the platform comprising:
   a lift beam for carrying a load of a transport cabin of a tower lift of the wind turbine;
   a bearing structure comprising the lift beam;
   a floor plate supported by the bearing structure; and
   an attachment means connected to the lift beam and configured for attaching one or more cables of the tower lift to the lift beam;
   wherein the floor plate is located between the lift beam and the attachment means, the lift beam being located below the floor plate, and the attachment means being located above the floor plate.

2. The platform according to claim 1, wherein the lift beam is integrally formed with the bearing structure.

3. The platform according to claim 1, wherein the floor plate is fixed to the lift beam.

4. The platform according to claim 1, wherein the lift beam comprises one or more openings for passage of one or more cables of the tower lift.

5. The platform according to claim 1, wherein the attachment means includes one or more brackets and one or more pins supported by the one or more brackets, each pin of the one or more pins being configured for connection with one of the one or more cables of the tower lift.

6. The platform according to claim 1, wherein the lift beam has a double-C-shaped cross-section profile.

7. The platform according to claim 1, wherein:
   the attachment means includes a bracket having a top-hat cross-section profile;
   the lift beam has a gap between two back-to-back arranged C-shaped profiles of a double-C-shaped cross-section profile of the lift beam, the gap being configured for passage of the one or more cables of the tower lift;
   the attachment means is connected to the lift beam such that flanges of the top-hat profile are connected with upper flanges of the double-C-shaped profile; and/or
   the attachment means includes one or more pins supported by the bracket, each pin of the one or more pins being configured for connection with one of the one or more cables of the tower lift when passed through the gap of the lift beam.

8. A wind turbine, comprising:
   a tower;
   a lower platform and an upper platform inside the tower;
   a tower lift comprising a transport cabin for travelling from the lower platform to the upper platform or vice versa; and
   a platform, wherein the platform is arranged inside the tower of the wind turbine above the upper platform, wherein a lift beam of the platform carries a load of the transport cabin of the tower lift, wherein the lift beam comprises one or more openings for passage of one or more cables of the tower lift.

9. The wind turbine according to claim 8, wherein the one or more cables are attached to the lift beam of the platform.

10. The wind turbine according to claim 9, wherein the one or more cables of the tower lift include a drive cable, a safety cable and/or one or more guide cables, the drive cable and the safety cable being attached to the transport cabin of the tower lift for carrying the transport cabin, and the one or more guide cables being attached to a lower portion of the tower below the lower platform.

11. A method for assembling a wind turbine, the method comprising:
   a) manufacturing a platform, the platform comprising a lift beam for bearing a load of a transport cabin of a tower lift, wherein the lift beam comprises one or more openings for passage of one or more cables of the tower lift; and
   b) installing the platform in a tower.

12. The method according to claim 11, comprising, after step b), installing the tower lift in the wind turbine tower, wherein one or more cables of the tower lift are attached to the lift beam, and the one or more cables are configured for carrying and/or guiding the transport cabin of the tower lift.

13. A platform for a wind turbine, the platform comprising:
- a lift beam for carrying a load of a transport cabin of a tower lift of the wind turbine, wherein the lift beam comprises one or more openings for passage of one or more cables of the tower lift.

\* \* \* \* \*